United States Patent
Klee et al.

(10) Patent No.: US 8,511,164 B2
(45) Date of Patent: Aug. 20, 2013

(54) DETECTION DEVICE OF A MOTOR VEHICLE AND A CORRESPONDING DETECTION METHOD

(75) Inventors: Ulrich Klee, Leonberg (DE); Wei-Chia Lee, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 879 days.

(21) Appl. No.: 12/336,590

(22) Filed: Dec. 17, 2008

(65) Prior Publication Data

US 2009/0178486 A1    Jul. 16, 2009

(30) Foreign Application Priority Data

Jan. 16, 2008   (DE) .................. 10 2008 004 641

(51) Int. Cl.
*G01N 29/44*   (2006.01)
*G01S 13/08*   (2006.01)

(52) U.S. Cl.
USPC ............. 73/602; 342/104; 180/169; 180/167

(58) Field of Classification Search
USPC ................. 73/602; 180/167, 169; 342/104
See application file for complete search history.

(56) References Cited

U.S. PATENT DOCUMENTS

| | | | | |
|---|---|---|---|---|
| 4,980,869 A | * | 12/1990 | Forster et al. | 367/99 |
| 5,076,384 A | * | 12/1991 | Wada et al. | 180/169 |
| 5,531,118 A | * | 7/1996 | Knoll et al. | 73/628 |

FOREIGN PATENT DOCUMENTS

| | | |
|---|---|---|
| DE | 199 29 794 | 1/2000 |
| DE | 10 2004 006015 | 8/2005 |
| DE | 10 2004 024 695 | 12/2005 |
| DE | 10 2005 003 970 | 8/2006 |
| DE | 10 2005 013 146 | 9/2006 |
| DE | 10 2005 013 589 | 9/2006 |
| DE | 10 2005 052 633 | 5/2007 |
| DE | 10 2005 057 973 | 6/2007 |
| EP | 1 734 380 | 12/2006 |
| JP | 54040600 A * | 3/1979 |
| JP | 57175266 A * | 10/1982 |

* cited by examiner

*Primary Examiner* — Peter Macchiarolo
*Assistant Examiner* — Rose M Miller
(74) *Attorney, Agent, or Firm* — Kenyon & Kenyon LLP

(57) ABSTRACT

A detection device of a motor vehicle having a functional unit for transmitting and receiving signals. The functional unit has at least one first and one additional functional element, the signal inputs of which are subject to a comparison to determine an associative signal occurrence, and if the signals are absent in one of the functional elements, a configuration of its transmission/reception range to a road surface to be detected is performed in such a way that the corresponding functional element is forced to received signal reflections if it is functioning. A corresponding method is also provided.

6 Claims, 2 Drawing Sheets

DETECTION DEVICE OF A MOTOR VEHICLE AND A CORRESPONDING DETECTION METHOD

BACKGROUND INFORMATION

A detection device and a corresponding detection method are described in German Patent Application No. DE 10 2004 006 015. In this case, a device is used to adjust a threshold value of a detection unit, preferably in an ultrasound system for vehicle surroundings detection. In addition to a transmission/reception device for transmitting a transmission burst at a predetermined pulse repetition rate and a predetermined signal frequency and for receiving a received signal, the device has a signal processing device for conditioning the received signal. In addition, the detection device is used to determine a received signal magnitude from the received signal as an interference level test after a first predetermined period of time starting from a signal burst within a predetermined second period of time. In order to adjust a threshold value of the detection device as a function of the detected received signal magnitude as an interference level test, the device also has a control unit. The same applies correspondingly to the method for adjusting a threshold value of the detection unit described in the above-mentioned patent application.

An object of the known device and the described method is to be able to use expanded detection functions even in dynamic surroundings in which an acoustic interference level may change rapidly, due, for example, to a passing two-cycle motorcycle, wind noise, and/or so-called microphonics. The microphonics depend on the engine load or the engine speed or even other vehicle vibrations.

SUMMARY OF THE INVENTION

The detection device of the present invention has the advantage over the related art in that the operational readiness and operability of each individual functional element, in particular a sensor, are able to be checked. In this connection, the functional unit has at least one first and one additional functional element, the signal inputs of which are subject to a comparison to determine an associative signal emergence, and if the signals are absent in one of the functional elements, a configuration of its transmission/reception range to a road surface to be detected is performed in such a way that the corresponding functional element is forced to received signal reflections if it is functioning. If signal reflections or echoes of the road surface are still not detected by the configured functional element, it is inferred from this that the corresponding functional element is no longer able to recognize or detect any targets at all and consequently the status "non-functioning" or "blind" is assigned.

Accordingly, this constellation makes it possible to detect non-functioning sensors using a function test. In particular, the present system may be used to differentiate between situations in which "sensor blindness" has occurred and in which there is simply no object in the detection range of the functional element. In the event of error, the detection device may subsequently be automatically switched off or information may even be output to the vehicle driver. The vehicle driver may then choose from among different options; they include, for example, manual cleaning, manual shutdown of the detection device, or even a visit to the closest customer service location. The same applies by analogy to the detection method according to the present invention.

According to an advantageous embodiment of the present invention it is provided that only one subrange of the transmission/reception range is configured in the functional element to be checked, making it possible to detect objects, obstructions, persons or the like in the vehicle's surroundings during a self-test. In other words, the detection function of the detection device is preserved even during a verification cycle.

According to another advantageous embodiment of the present invention it is provided that the configuration of the transmission/reception range is based on an amplitude adjustment. In doing so, an amplitude threshold of the functional element to be tested, in particular a sensor, is reconfigured in such a way that it no longer suppresses surface echoes.

According to a preferred embodiment of the present invention it is provided that an error signal is generated if no signal is received. An error signal may be used, for example, to initiate another check of the functional unit in question, to cause the detection unit to be shut down, or also to output information to the driver, making it possible for actions to be executed according to a tested pattern.

According to another preferred embodiment of the present invention it is provided that the functions are executed using a control unit, in particular a microcontroller. In this connection, the control unit takes over control and/or regulation of processes to be carried out, also including the self-test of the functional elements. The control unit may either be used as a separate component or designed as an integral component of an already existing control unit.

DETAILED DESCRIPTION

Figure 1:
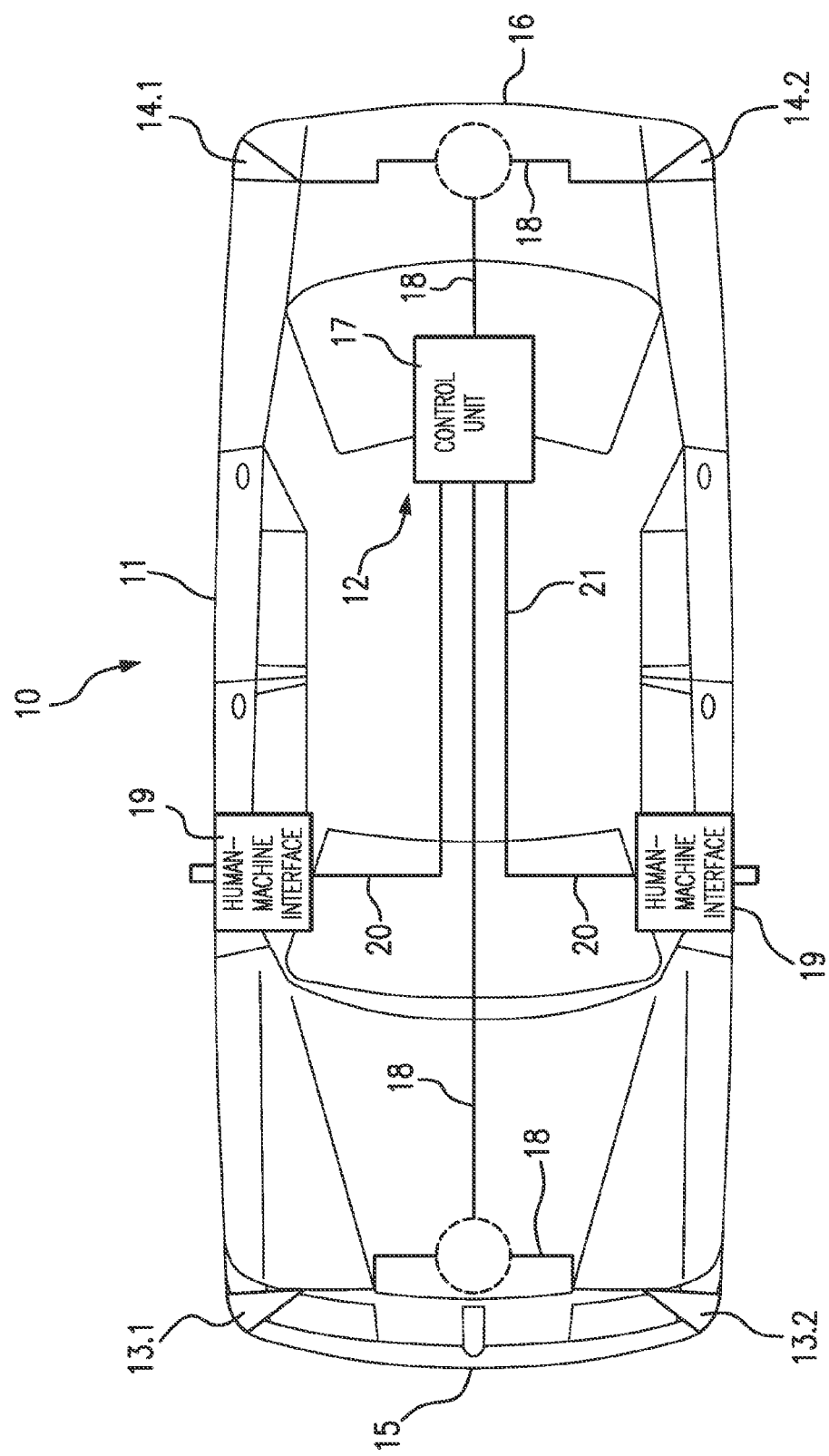
FIG. 1 schematically shows a cross-sectional representation of a vehicle having a plurality of functional elements, in particular sensors, as a part of a detection device.

FIG. 1 shows a detection device 10 of a vehicle 11 including a functional unit 12 for transmitting and receiving signals. In the present embodiment, functional unit 12 has four functional elements 13.1; 13.2; 14.1; 14.2. Functional elements 13.1; 13.2; 14.1; 14.2 are designed as sensors, in particular as ultrasound sensors. Two functional elements 13.1; 13.2 are situated on a front bumper 15 of the vehicle 11 and the two other functional elements 14.1; 14.2 are situated on a rear bumper 16 of vehicle 11. The positioning of each individual functional element 13.1; 13.2; 14.1; 14.2 on bumpers 15; 16 is carried out in such a way that the largest possible detection range is able to be covered.

Ultrasound sensors 13.1; 13.2; 14.1; 14.2 are based on a functional principle according to which sound in space spreads as a longitudinal wave, the ambient air serving as a medium for the sound wave. In such a non-homogeneous medium, the propagation rate is a function of density and, accordingly, location. At places having a density change, the sound wave is in addition partially reflected. In a uni-axial observation of these events, each change in density causes an echo to be reflected to the ultrasound source, it being possible for the echo to be recaptured and evaluated as a signal. Ultrasound sensors 13.1; 13.2; 14.1; 14.2 take advantage of this effect. An ultrasound signal generated, for example, by a piezoelectric drive, is transmitted to a randomly shaped boundary surface between two media via an excited membrane and is subsequently recaptured. If the density of the medium is known, the difference in time between the transmission and reception of a signal provides information concerning the distance between the boundary surface and the particular sensor 13.1; 13.2; 14.1; 14.2. This makes a longitudinal measurement along the sound propagation possible. In this connection, ultrasound sensors 13.1; 13.2; 14.1; 14.2 are designed as transmitters and simultaneously as receivers and thus have the properties of sensors and actuators.

In addition to functional elements 13.1; 13.2; 14.1; 14.2, functional unit 12 of detection device 10 includes in particular SVA sensors (side view assist sensors) and also an SVA control unit 17 (side view assist engine control unit) which is in an operative data exchange connection with the sensors via control lines and/or data lines 18. Control unit 17 also includes a so-called human-machine interface 19 in a control/regulation process via corresponding leads 20. Furthermore, control unit 17 receives and transmits information and data by means of a bus system 21, in particular a so-called low-speed CAN bus, for example to a superordinate control unit of vehicle 11. The aforementioned SVA technology stands for an assistance system which supports the driver when entering and leaving parking spaces, during vehicle maneuvers, and in tight traffic situations. In particular, detection device 10 is used to monitor the so-called "blind spot."

The CAN bus (controller area network) is classified as a field bus. This is an asynchronous, serial bus system which is used for the networking of control units in automobiles. The operation of the CAN bus is based on the CSMA/CR process (carrier sense multiple access/collision resolution). Collisions are avoided during a bus access by arbitration or bit arbitration. The data are encoded as NRZ-L (non-return to zero). Furthermore, the cyclical redundancy check (CRC) is used for data protection. Bit stuffing is used for continuous synchronization of the bus nodes. Bus 21 is equipped either with copper leads or glass fibers. The CAN bus operates according to the so-called multi-master principle, a plurality of equal-access control units, i.e., bus nodes, being connected to one another via a topological system. Data transmission takes place in that a data bit, depending on the state, has either a dominant or recessive effect on the bus leads. A dominant data bit overwrites a recessive data bit. In the CAN bus architecture, a distinction is made between a high-speed and a low-speed bus. In a high-speed bus, the maximum data transfer rate is 1 Mbit/s, while it is only possible to achieve a data transfer rate of 125 kbit/s in a low-speed bus.

From the perspective of the vehicle driver, the "blind spot" is located at the left rear and right rear beside vehicle 11 when a flat rearview mirror is used. If vehicle 11 is passed by another road user, the driver of passed vehicle 11 is unable to see the road user for a certain length of time unless he looks over his left shoulder. Although the German Highway Code requires a check over the shoulder, this is often neglected. Improved detection of the surroundings may be provided in particular when changing lanes, in a passing maneuver, when turning, and also when entering or leaving a parking space. In this connection, described detection device 10 which monitors the "blind spot" on the left and right side of vehicle 11 offers technical support for the driver. If another vehicle is present in these zones, the system warns the driver via a visual and/or acoustic signal. However, vehicles coming from the opposite direction are not displayed if the additional vehicle is moving in the same direction of travel as vehicle 11. In principle, a warning is given if an object approaches vehicle 11. As an option, the size of the monitoring or also observation zone may be adjusted as a function of the true speed of vehicle 11. Objects having only slight movement relative to vehicle 11 are displayed and/or warned of based on a detection of the surroundings using sensors, for example by means of ultrasound sensors 13.1; 13.2; 14.1; 14.2 when vehicle 11 is moving forward starting from a specific speed.

In order to make such surroundings detection possible, it is necessary to detect objects using functional elements 13.1; 13.2; 14.1; 14.2, i.e., sensors, and ascertain the distance between the particular object and vehicle 11 without errors using algorithms. For example, ultrasound sensors (USS) having a high range and high sensitivity are used for this purpose, so that it is possible to measure the signal reflections or signal echoes from the approaching object or vehicle. Sensors 13.1; 13.2; 14.1; 14.2 are configured in such a way that echoes occurring during travel and caused by the road surface are suppressed by a set amplitude threshold value of the particular sensor. If functional elements 13.1; 13.2; 14.1; 14.2 are covered by dirt, mud, snow, ice, and the like, the sensors are no longer able to receive the echoes detected and reflected by objects, so that this is referred to as so-called "sensor blindness."

In the present case, a remedy is provided by subjecting given signal inputs of functional elements 13.1; 13.2; 14.1; 14.2 to a comparison for determining an associative signal emergence. In other words, the information supplied by measuring sensors 13.1; 13.2; 14.1; 14.2 is continuously compared, the focus being on a comparison of the information from the front sensors with the information from the rear sensors. If one of sensors 13.1; 13.2; 14.1; 14.2 no longer supplies distance measuring data for a specifiable period of time in contrast to other sensors 13.1; 13.2; 14.1; 14.2, only one specific transmission/reception range of the corresponding sensor is set in such a way that reflections from the road surface must be detected. If the signals in one of functional elements 13.1; 13.2; 14.1; 14.2 are absent, it is thus possible to configure the transmission/reception range to a road surface to be detected in such a way that corresponding functional element 13.1; 13.2; 14.1; 14.2 is forced to received signal reflections if it is functioning. Accordingly, this constellation makes it possible to detect non-functioning sensors using a function test. In particular, the present system may be used to differentiate between situations in which sensor blindness has occurred and in which there is simply no object in the detection range of functional element 13.1; 13.2; 14.1; 14.2.

Detection device 10 and an associated system, in particular a driver assistance system, for surroundings monitoring is designed to warn the driver as soon as an object is located in a "blind spot" present at the vehicle. However, it is not desirable for the driver to be informed of an approaching object without exception and in every case because this would result in a profusion of warnings and ultimately in sensory overload. For example, the system would cause a continuous warning when traveling along a guard rail, for which reason it is necessary to limit information to relevant objects. Functional elements 13.1; 13.2; 14.1; 14.2, i.e., sensors, are used to filter objects not to be detected. Using sensor 14.1 situated at the rear right of the vehicle having a 450 detection angle in relation to the vehicle's longitudinal axis, it is possible to detect objects in the "blind spot" located on the vehicle's right side. Over a predefinable time and traveled driving distance, front sensor 13.1 situated on the same side of the vehicle determines the plausibility of objects such as guard rails and/or vehicles coming from the opposite direction in cooperation with functional unit 12, so that an associated warning is suppressed.

So that the "blind spot" monitoring functions reliably, full functionality of front sensors 13.1; 13.2 and rear sensors 14.1; 14.2 must be ensured. If one or more sensors are no longer functional, for example due to icing, snow cover, impact of a stone or the like, the system must recognize this condition in order to be able to initiate an appropriate response or action. For example, information to the driver, a shutdown of the system, etc., may be initiated as an action. A correlation of object patterns in front sensors 13.1; 13.2 and rear sensors 14.1; 14.2 may be used for detecting sensor malfunctions.

It is highly probable that another vehicle passing by vehicle 11 will generate a classifiable pattern. In a first pattern according to which oncoming traffic and corresponding vehicles are passed by vehicle 11, these road users are initially detected in front left sensor 13.2 and subsequently in rear left sensor 14.2. In contrast, road users passing vehicle 11 are first detected in rear left sensor 14.2 and subsequently in front left sensor 13.2. In significantly rarer cases, it may also occur that another vehicle moves at approximately the same distance from and at approximately the same speed as vehicle 11 before it falls back or accelerates. Only in these cases is the object exclusively detected in at least one of front sensors 13.1; 13.2 or exclusively in at least one of rear sensors 14.1; 14.2.

For monitoring the function of sensors 13.1; 13.2; 14.1; 14.2, it is highly probable that both of the above-mentioned cases will be used. As long as it is possible to detect objects in front sensors 13.1; 13.2 or rear sensors 14.1; 14.2, the function of all sensors may be assumed. However, if an object is repeatedly detected only in front sensor 13.1; 13.2 or only in rear sensor 14.1; 14.2 without an object being detected in the corresponding sensor, the probability of a sensor malfunction rises significantly.

In addition to the correlation of front and rear sensors 13.1; 13.2; 14.1; 14.2, the velocity of vehicle 11 also has an influence on the probability of a sensor malfunction. At a very constant velocity, the probability of another vehicle traveling at the same velocity increases. On the other hand, a highly variable velocity of vehicle 11 reduces this probability. A very low velocity of vehicle 11 suggests city traffic. In this case, the probability that an object will appear only in front sensors 13.1; 13.2 or only in rear sensors 14.1; 14.2 is very low because standing objects and other road users are located in front of and behind vehicle 11 at a certain degree of constancy. A very high velocity suggests that travel on an expressway is taking place. In this case also, the probability that an object appears only in front of or only behind vehicle 11 is rather low. Because objects such as trucks are passed at a certain velocity, or vehicle 11 itself is passed by other road users, regular echoes, in particular ultrasound echoes, should be received if all sensors 13.1; 13.2; 14.1; 14.2 are functioning correctly.

If the probability of a sensor malfunction surpasses a specific value, an amplitude threshold 22 of the "blind" sensor or sensor presumed to be "blind" may be reconfigured to make it no longer capable of suppressing surface echoes. In such a case, a functioning sensor returns an echo of the surface. However a "blind" sensor will continue to detect no echoes, thus confirming the malfunction and making it possible to initiate appropriate measures.

Figure 3:
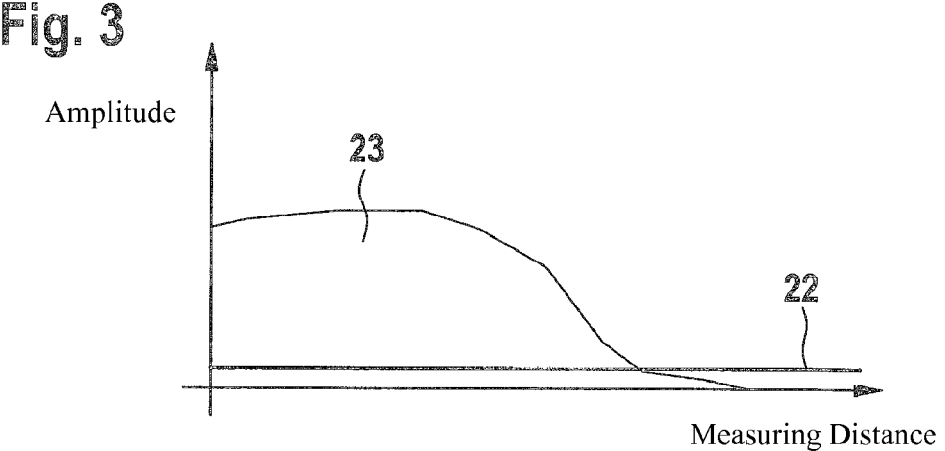
FIG. 3 shows another amplitude measuring distance diagram in a setting of the amplitude threshold for detecting surface echoes.

In the simplest case, amplitude threshold 22 according to FIG. 3 is set in such a way that it is no longer possible to filter surface echoes. However, the result of this is that the corresponding sensor is no longer able to detect objects other than the road surface during the test phase. It is possible to achieve an optimized procedure by lowering amplitude threshold 22 according to FIG. 4 in only a small measuring range of the sensor—preferably in the measuring range for larger distances. This makes it possible to continue to detect relevant objects at close range, while the surface echoes from the far range of the sensors are usable for blindness detection. Although this limits the detection range of the particular sensor during blindness detection, it is not completely suppressed as in the above-mentioned embodiment.

Figure 2:
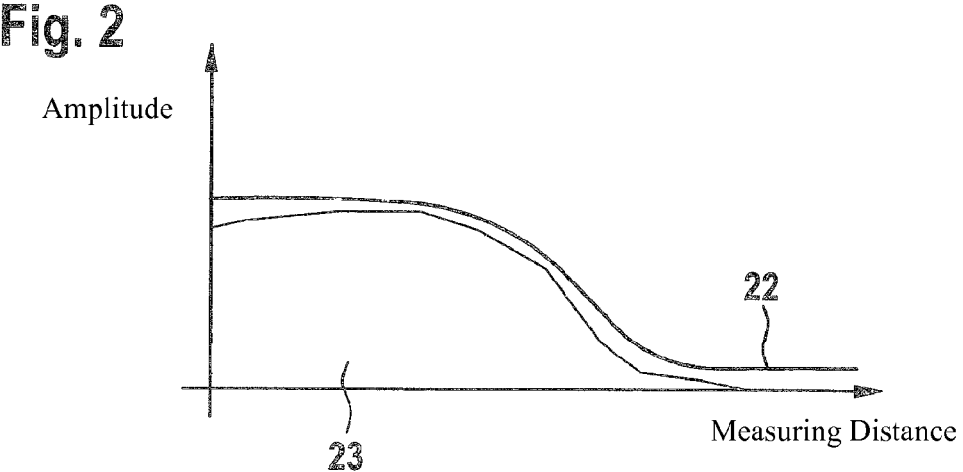
FIG. 2 shows a first amplitude measuring distance diagram in a standard setting of an amplitude threshold of the functional element to be checked.
Figure 4:
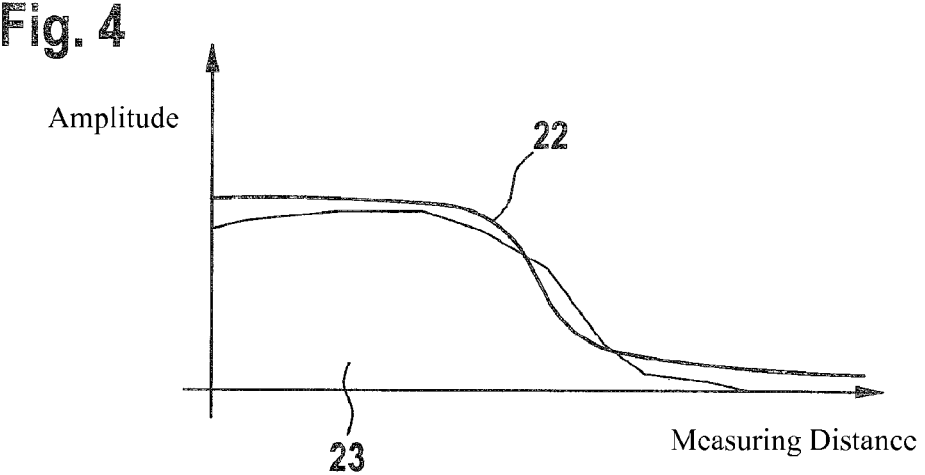
FIG. 4 shows a last amplitude measuring distance diagram in a combination setting of the amplitude threshold for detecting surface echoes and for detecting objects in the surroundings.

A diagram in FIG. 2 shows the standard setting of amplitude threshold 22, this setting being located above a surface echo 23. While the amplitude is depicted on the y-axis, the measuring distance is plotted on the x-axis. Amplitude threshold 22 of the corresponding sensor is clearly lowered in FIG. 3 in order to be able to detect surface echo 23. FIG. 4 shows an improved setting of amplitude threshold 22 for detecting surface echoes 23 while simultaneously detecting objects in the detection range of the sensor. The vertical axis and the horizontal axis of the two diagrams according to FIGS. 3 and 4 correspond to the axes according to FIG. 2.

In summary, detection device 10 of vehicle 11 is provided with functional unit 12 for transmitting and receiving signals which has at least two functional elements 13.1; 13.2; 14.1; 14.2. The signals detected by measuring functional elements 13.1; 13.2; 14.1; 14.2 are subject to a continuous, cyclical, or random comparison. If the signals of one of the functional elements are absent, its transmission/reception range is adjusted or parameterized to a road surface to be detected in such a way that the relevant functional element, if functioning, is forced to received signal reflections via the road surface. This results in blindness recognition by correlating the signals from the measuring sensors. Furthermore, a corresponding method is used to check the ultrasound sensors for functionality during vehicle operation.

What is claimed is:

1. A detection device of a motor vehicle comprising:
   a functional unit for transmitting and receiving signals, the functional unit including at least one first and one additional functional element; and
   a computer processor configured to:
      compare signals received at the functional elements and determine an associative signal occurrence based on the comparison;
      if the determined associative signal occurrence indicates that signals are absent in one of the functional elements, configure a subrange of a transmission/reception range of the corresponding functional element to a road surface to be detected in such a way that the corresponding functional element is forced to receive signal reflections if it is functioning; and
      reduce an amplitude threshold in a reflected signal measuring range for long distances in such a way that signal reflections from the road surface are detected only at the long distances and not at shorter distances.

2. The detection device according to claim 1, wherein the processor is configured to generate an error signal if no signal is received.

3. A method of detection in a motor vehicle, in which a detection device of the motor vehicle is provided with a functional unit for transmitting and receiving signals, wherein the functional unit has at least one first and one additional functional element, the method comprising:
   comparing, by a computer processor, signals received at the functional elements;
   determining, by the processor, an associative signal occurrence based on the comparison; and if signals are absent in one of the functional elements, configuring, by the processor, a subrange of a transmission/reception range of the corresponding functional element to a road surface to be detected in such a way that the corresponding functional element is forced to receive signal reflections if it is functioning, wherein the configuration reduces an amplitude threshold in a reflected signal measuring range for long distances in such a way that the signal reflections from the road surface are detected only at the long distances and not at shorter distances.

4. The method according to claim 3, further comprising generating an error signal in the absence of a signal reception.

5. A detection device of a motor vehicle comprising:
a functional unit for transmitting and receiving signals, the functional unit including a first functional element and a second functional element; and
a computer processor configured to:
compare signals received at the first and second functional elements;
if a result of the comparison indicates that signals are present in one of the first and second functional elements and are absent in the other of the first and second functional elements, reduce an amplitude threshold of the other of the first and second functional elements to force the other of the first and second functional elements to detect signal reflections of a road surface if the other of the first and second functional elements is functioning; and
reduce the reduction of the amplitude threshold only for a subrange of a transmission/reception range of the other of the first and second functional units that corresponds to a first distance from the other of the first and second functional elements that is greater than a second shorter distance from the other of the first and second functional elements that corresponds to a range for which the reduction is not performed.

6. A method of detection in a motor vehicle, in which a detection device of the motor vehicle is provided with a functional unit for transmitting and receiving signals, wherein the functional unit includes a first functional element and a second functional element, the method comprising:
comparing, by a computer processor, signals received at the first and second functional elements; and
if a result of the comparison indicates that signals are present in one of the first and second functional elements and are absent in the other of the first and second functional elements, reducing, by the processor, an amplitude threshold of the other of the first and second functional elements to force the other of the first and second functional elements to detect signal reflections of a road surface if the other of the first and second functional elements is functioning, wherein the reduction of the amplitude threshold is performed only for a subrange of a transmission/reception range of the other of the first and second functional units that corresponds to a first distance from the other of the first and second functional elements that is greater than a second shorter distance from the other of the first and second functional elements that corresponds to a range for which the reduction is not performed.

* * * * *